United States Patent
Huan et al.

(10) Patent No.: US 11,146,384 B2
(45) Date of Patent: Oct. 12, 2021

(54) METHOD, SYSTEM, COMPUTER SYSTEM AND STORAGE MEDIUM OF UPLOADING BLOCKCHAIN DATA

(71) Applicant: ONE CONNECT SMART TECHNOLOGY CO., LTD., Shenzhen (CN)

(72) Inventors: Pengfei Huan, Shenzhen (CN); Frank Yifan Chen Lu, Shenzhen (CN); Yu Zhang, Shenzhen (CN); Danli Xie, Shenzhen (CN)

(73) Assignee: ONE CONNECT SMART TECHNOLOGY CO., LTD. (SHENZHEN), Shenzhen (CN)

(*) Notice: Subject to any disclaimer, the term of this patent is extended or adjusted under 35 U.S.C. 154(b) by 25 days.

(21) Appl. No.: 16/099,437

(22) PCT Filed: Feb. 6, 2018

(86) PCT No.: PCT/CN2018/075497
§ 371 (c)(1),
(2) Date: Nov. 7, 2018

(87) PCT Pub. No.: WO2019/061983
PCT Pub. Date: Apr. 4, 2019

(65) Prior Publication Data
US 2021/0226770 A1    Jul. 22, 2021

(30) Foreign Application Priority Data
Sep. 30, 2017   (CN) .......................... 201710917330.0

(51) Int. Cl.
*H04L 9/06* (2006.01)
*H04L 9/08* (2006.01)

(52) U.S. Cl.
CPC .......... *H04L 9/0643* (2013.01); *H04L 9/0819* (2013.01); *H04L 9/0869* (2013.01); *H04L 2209/38* (2013.01)

(58) Field of Classification Search
CPC ... H04L 9/0643; H04L 9/0819; H04L 9/0869; H04L 2209/38
See application file for complete search history.

(56) References Cited

U.S. PATENT DOCUMENTS

2016/0219109 A1* 7/2016 Blahaerath ............ G06F 3/0665
2017/0213209 A1   7/2017 Dillenberger
(Continued)

FOREIGN PATENT DOCUMENTS

CN   103747274 A   4/2014
CN   104239509 A   12/2014
(Continued)

OTHER PUBLICATIONS

EP Search Report dated Jan. 16, 2020 in the corresponding EP application (application No. 18804502.5).

*Primary Examiner* — Mohammed Waliullah
(74) *Attorney, Agent, or Firm* — Kilpatrick Townsend & Stockion LLP

(57) ABSTRACT

A method of uploading blockchain data includes: a sub-institution node group receiving a data upload request sent by a sub-institution; the sub-institution node group looking up a node in an idle state according to the data upload request; the sub-institution node group receiving data uploaded by the sub-institution through the node in the idle state and uploading the received data to a blockchain temporary storage area; and the master institution node of the master institution corresponding to the sub-institution downloading the data uploaded by the sub-institution from the (Continued)

temporary storage area, and then uploading the downloaded data to a blockchain data storage area.

15 Claims, 4 Drawing Sheets

(56) References Cited

U.S. PATENT DOCUMENTS

| | | | |
|---|---|---|---|
| 2018/0123779 A1* | 5/2018 | Zhang | H04L 9/0637 |
| 2018/0161478 A1 | 6/2018 | Gumusderelioglu et al. | |
| 2018/0276668 A1 | 9/2018 | Li | |
| 2019/0165948 A1* | 5/2019 | Sako | H04L 9/3239 |

FOREIGN PATENT DOCUMENTS

| | | |
|---|---|---|
| CN | 104618255 A | 5/2015 |
| CN | 106534317 A | 3/2017 |
| CN | 106603198 A | 4/2017 |
| CN | 106850536 A | 6/2017 |
| CN | 106899680 B | 6/2017 |
| CN | 106980649 A | 7/2017 |
| CN | 107079059 A | 8/2017 |
| CN | 107122682 A | 9/2017 |
| CN | 107196900 A | 9/2017 |
| JP | 2017123116 A | 7/2017 |

\* cited by examiner

METHOD, SYSTEM, COMPUTER SYSTEM AND STORAGE MEDIUM OF UPLOADING BLOCKCHAIN DATA

CROSS-REFERENCE TO RELATED APPLICATION

This application is a continuation application of international application no. PCT/CN2018/075497, filed Feb. 6, 2018, which claims priority from Chinese Patent Application No. 2017109173300 filed Sep. 30, 2017 in the Chinese Patent Office, entitled "METHOD, SYSTEM, COMPUTER SYSTEM, AND STORAGE MEDIUM OF UPLOADING BLOCKCHAIN DATA", the entire contents of which are incorporated herein by reference.

FIELD

The present application relates to a method, a system, a computer system, and a storage medium of uploading blockchain data.

BACKGROUND

In the blockchain data authority distribution system, the access is only provided to the primary institution, that is, the uploading and the authorized reading of data by the master institution. For example, the bank only allows the head office to transfer data to the blockchain, and does not allow the branch office to directly transfer data to the blockchain. In the conventional technology, the data in each branch office has to be aggregated to the head office first, and then the head office uploads the data to the blockchain through the secondary node corresponding to the head office. This results in all data being aggregated into the head office, and the pressure is overwhelming for the head office upload data.

SUMMARY

According to various embodiments disclosed herein, a method, a system, a computer system, and a storage medium of uploading blockchain data are provided.

A method of uploading blockchain data, includes: a sub-institution node group receiving a data upload request sent by a sub-institution; the sub-institution node group looking up a node in an idle state in the sub-institution node group according to the data upload request; the sub-institution node group receiving data uploaded by the sub-institution through the node in the idle state and uploading the received data to a blockchain temporary storage area; and the master institution node of the master institution corresponding to the sub-institution downloading the data uploaded by the sub-institution from the temporary storage area, and then uploading the downloaded data to a blockchain data storage area.

A system of uploading blockchain data, includes: a sub-institution node group configured to receive a data upload request sent by a sub-institution; look up a node in an idle state in the sub-institution node group according to the data upload request; and receive data uploaded by the sub-institution through the node in the idle state, and upload data received to a blockchain temporary storage area; and a master institution node of the master institution corresponding to the sub-institution configured to download the data uploaded by the sub-institution from the temporary storage and then upload the downloaded data to a blockchain data storage area.

A computer system includes a sub-institution node group and a master institution node of a master institution corresponding to the sub-institution; the sub-institution node group includes a plurality of nodes, the plurality of nodes includes a first memory and one or more first processors, the first memory has computer-readable instructions stored therein which, when executed by the one or more first processors, cause the one or more first processors to perform: receiving a data upload request sent by a sub-institution; looking up a node in an idle state in the sub-institution node group according to the data upload request; and receiving data uploaded by the sub-institution through the node in the idle state and then uploading the received data to a blockchain temporary storage area; the master institution node of the master institution corresponding to the sub-institution includes a second memory and one or more second processors, the second memory has computer-readable instructions stored therein which, when executed by the one or more second processors, cause the one or more second processors to perform: downloading the data uploaded by the sub-institution from the temporary storage area, and then uploading the downloaded data to a blockchain data storage area.

One or more non-transitory computer-readable storage medium has computer-readable instructions stored therein which, when executed by one or more first processors, cause the one or more first processors to perform: receiving a data upload request sent by a sub-institution; looking up a node in an idle state in the sub-institution node group according to the data upload request; and receiving data uploaded by the sub-institution through the node in the idle state and then uploading the received data to a blockchain temporary storage area; when executed by one or more second processors, the computer-readable instructions cause the one or more second processors to provide: downloading the data uploaded by the sub-institution from the temporary storage area, and then uploading the downloaded data to a blockchain data storage area.

The details of one or more embodiments of the application are set forth in the accompanying drawings and the description below.

BRIEF DESCRIPTION OF THE DRAWINGS

To illustrate the embodiments of the present disclosure or in the prior art more clearly, the accompanying drawings for describing the embodiments or the prior art are introduced briefly in the following. Apparently, the accompanying drawings in the following description are only some embodiments of the present disclosure.

DETAILED DESCRIPTION OF THE EMBODIMENTS

The present disclosure will be described in details in combination with the accompanying drawings. It should be understood that the particular embodiments are described for the purpose of illustrating as opposed to restricting the present disclosure.

Figure 1:
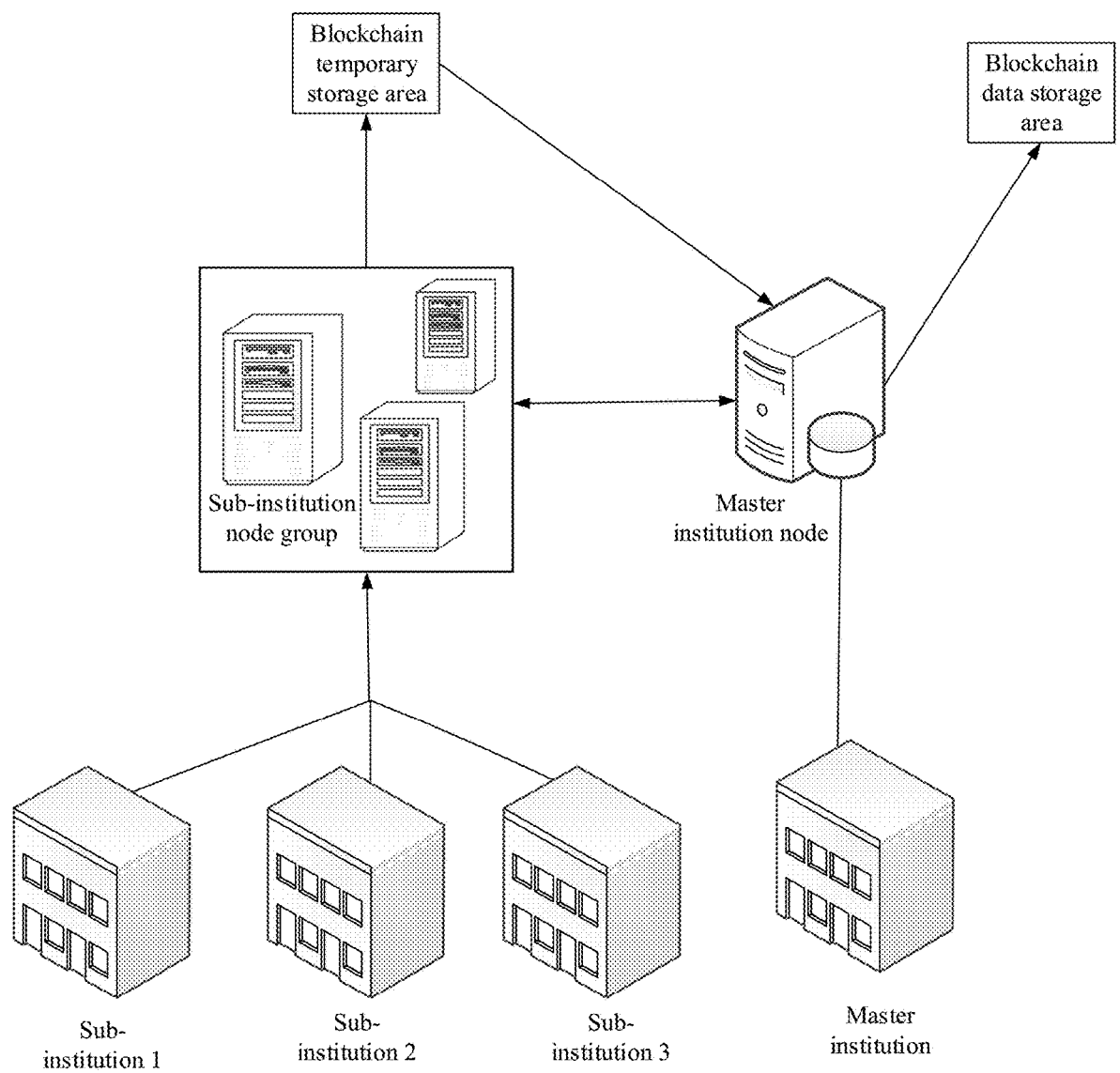
FIG. 1 is a block diagram of an application environment for a method of uploading blockchain data in accordance with one or more embodiments.

Referring to FIG. 1, FIG. 1 is a block diagram of an application environment of a method of uploading blockchain data according to one embodiment, a sub-institution, a sub-institution node group corresponding to the sub-institution, a master institution, a master institution node corresponding to the master institution, and a blockchain are illustrated. The blockchain is divided into a blockchain temporary storage area and a blockchain data storage area, the blockchain temporary storage area is configured to store the data uploaded by the sub-institution through the node group, and the blockchain data storage area is configured to store the data uploaded through the node, including data downloaded from the blockchain temporary storage area and uploaded to the blockchain data storage area by the master institution node, and data uploaded by the master institution through the master institution node.

In one embodiment, the master institution is a master institution of an organization such as a company, and the sub-institution is a branch institution of an organization such as a company. For example, the head office of the bank is the master, and the branch office is the sub-institution. The head office of the company is the master institution, then the branch office or the subsidiary is the sub-institution, and so on. The data of the sub-institution can be uploaded to the blockchain temporary storage area through the sub-institution node group, and does not require to be aggregated to the master institution manually and then be uploaded to the blockchain by the master institution through the master institution node, which can reduce the pressure of the master institution and offline manual operation, and improve the efficiency of data uploading to the blockchain.

The sub-institution node group includes a plurality of servers, and the plurality of servers can be deployed in a distributed manner or in a centralized manner. The data uploading can be implemented through the plurality of servers. The master institution node is a server, and the master institution can upload data to the blockchain data storage area through the master institution node.

Figure 2:
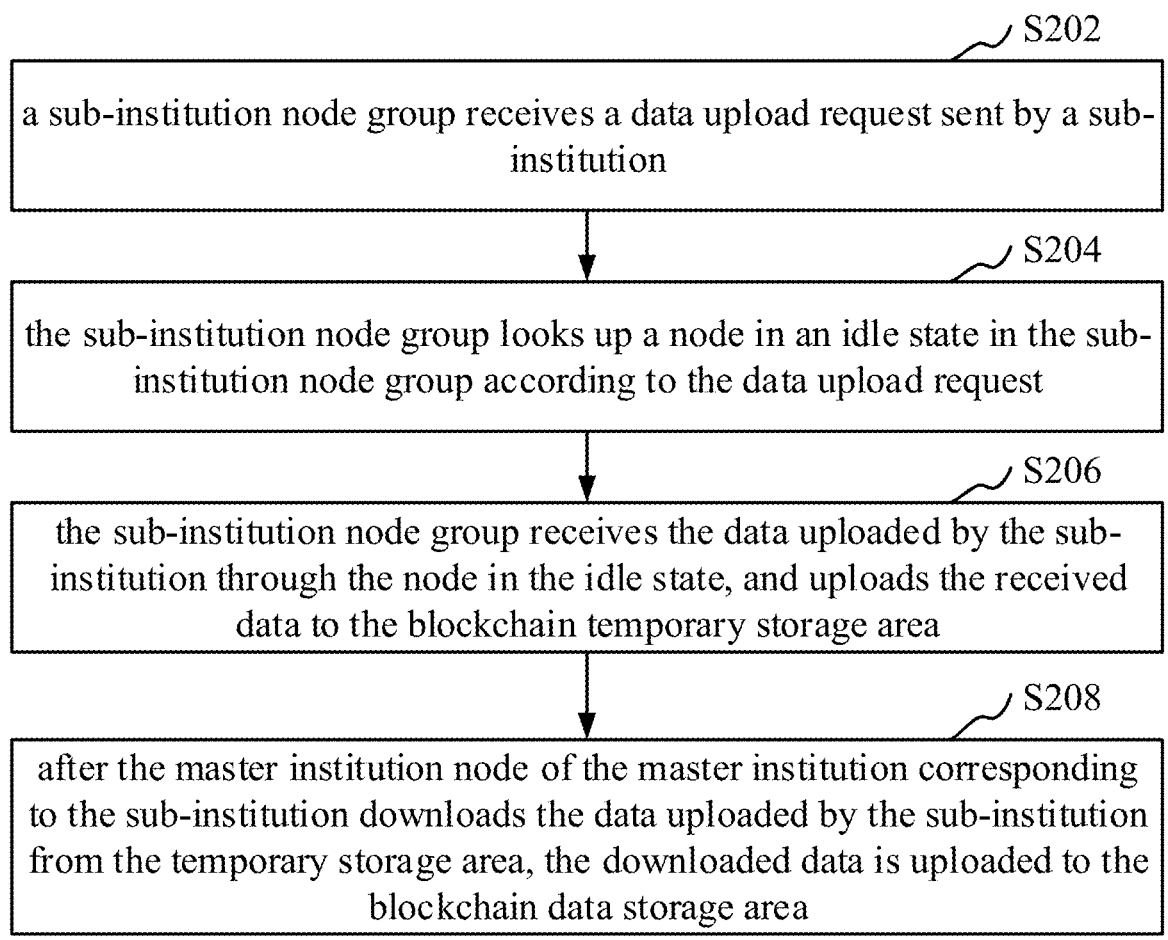
FIG. 2 is a flow chart of a method of uploading blockchain data in accordance with one or more embodiments.

In one embodiment, as shown in FIG. 2, a method of uploading blockchain data is provided, and the method in one embodiment includes the following steps:

In step S202: a sub-institution node group receives a data upload request sent by a sub-institution.

In one embodiment, the sub-institution will generate various data during the business process, which needs to be uploaded to the blockchain, so as to perform uniform management on the data. For example, the sub-institution may regularly upload data to the blockchain, for example once a day, a week or a month. Or the sub-institution may quantitatively upload data to the blockchain according to the amount of data, for example, when the amount of data reaches a preset number of pieces, such as one thousand pieces, two thousand pieces, five hundred pieces, etc., then the data is uploaded to the blockchain. When uploading data, the sub-institution first sends a data upload request to the sub-institution node group, so that the sub-institution node group allocates corresponding nodes for the sub-institution to complete data uploading.

In step S204: the sub-institution node group looks up a node in an idle state in the sub-institution node group according to the data upload request.

In one embodiment, after receiving the data upload request, the sub-institution node group queries the node in the idle state in the sub-institution node group. A distribution node may be preset in the node group, and is configured to distribute the node for the current data upload of the sub-institution according to the state of each node in the node group of the sub-institution and the data upload request. The node in the idle state refers to a node that is not currently uploading data.

In step S206: the sub-institution node group receives the data uploaded by the sub-institution through the node in the idle state, and uploads the received data to the blockchain temporary storage area.

In one embodiment, after obtaining the node in the idle state, the sub-institution node group receives the data uploaded by the sub-institution through the node in the idle state. The sub-institution may pre-agree with the sub-institution node group about the data encryption mode. The sub-institution may encrypt the data prior to uploading the data. When the node in the idle state in the sub-institution node group receives the encrypted data, the data may be decrypted according to a decryption mode corresponding to the pre-agreed encryption mode. So as to obtain the plaintext of the data uploaded by the sub-institution, and then upload the plaintext to the blockchain temporary storage area.

In step S208: after the master institution node of the master institution corresponding to the sub-institution downloads the data uploaded by the sub-institution from the temporary storage area, the downloaded data is uploaded to the blockchain data storage area.

In one embodiment, after the sub-institution uploads data to the sub-institution node group, the sub-institution node group re-uploads the data uploaded by the sub-institution to the blockchain temporary storage area, so that the master institution node of the master institution corresponding to the sub-institution can obtain the data from the temporary storage area and upload the data to the blockchain data storage area. So as to complete the uploading of the data of the sub-institution.

In the foregoing method of uploading blockchain data, the node in the deployed node group receives the data uploaded by the sub-institution, and stores the data uploaded by the sub-institution in the blockchain temporary storage area, so that the master institution node of the master institution corresponding to the sub-institution can upload the data stored in the temporary storage area to the blockchain data storage area to complete the data uploading, no manual collection of all the data to the master institution is required, and the pressure of the master institution is reduced.

In one embodiment, the step that the sub-institution node group looks up the node in the idle state in the sub-institution node group according to the data upload request includes: the sub-institution node group looks up a node in the normal working state in the sub-institution node group according to the data upload request; the sub-institution node group traverses the looked up nodes in the normal working state according to a preset order; and if the currently traversed node in the normal working state is uploading data, the sub-institution node group continues to traverse a next node in the normal working state according to the preset order, until the traversed node in the normal working state is in the idle state, and obtains the node in the idle state.

In one embodiment, when the sub-institution node group receives the data upload request from the sub-institution, the node in the idle state may be obtained according to a load balancing algorithm, and the load balancing algorithm may be a sequential round robin polling algorithm. A node in a sub-institution node group sets a weight value according to its state to determine whether the node is in a normal working state. For example, when the node is powered on, the weight value is not 0, indicating that the node is in the normal working state, and the allocation node in the node group is informed; when the node is powered off, the weight is set to 0, indicating that the node is not in a normal working state, and the allocation node in the node group is informed; or the weight value of the node is set according to the type of the node. For example, the weight value of the distribution node is always 0, this indicates that the distribution node does not participate in the direct uploading of the sub-institution data, and other nodes in the node group set their own weight value according to whether they are powered off. Alternatively, the weight of the node in the node group may be set according to whether the node is faulty. For example, the node in the node group may detect whether each hardware or software operates normally to determine whether the ego node in the node group is faulty, if the node is faulty, the weigh can be set as 0, and the distribution node can be informed, the weigh thereof can be otherwise set according to whether it is powered off. For example, when the weight of the node in the node group is 0, it indicates that the node in the node group is unavailable and undispatchable, that is, the node in the node group is not in the normal operation state. And when the weight of the node in the node group is not 0, it indicates that the node is in the normal operation state and can be used or dispatched. As such, the faulty nodes or the system maintaining nodes in the node group can be switch out of service according to the weights of the nodes in the node group.

After the node in the normal working state in the sub-institution node group is obtained, it is necessary to traverse whether the node in the normal working state is in the idle state. For example, the order of nodes may be preset, and it is assumed that there are four nodes in the node group: Node A, node B, node C, and node D. The four nodes may be first sorted into node A, node B, node C, and node D. Then, the node A, the node B, the node C and the node D are sequentially traversed in this order. If the node A is not in the idle state, i.e., the node A is uploading data, the node B needs to be traversed; and when the node B is in the idle state, data uploaded by the sub-institution is received directly through node B. And the data uploaded by the sub-institution is uploaded to the blockchain temporary storage area. Or assuming that the node B is faulty, the distribution node directly traverses the nodes A, C and D in the original order until the traversed node is in the idle state, then the data uploaded by the sub-institution is received through the node in the idle state, and the data uploaded by the sub-institution is uploaded to the blockchain temporary storage area.

In the foregoing embodiment, after receiving the data upload request sent by the sub-institution, the node in the idle state in the node group is obtained according to the uploading request, so that the sub-institution can upload data in a timely fashion, and multiple nodes in the node group are involved, so that a center of data uploading is not formed, thereby improving the flow of data uploading.

In one embodiment, prior to the step that the received data is uploaded to the blockchain temporary storage area, further includes: the sub-institution node group encrypts the data uploaded by the sub-institution by a first key, the first key is generated according to a first key keycode provided by the master institution node. For example, the sub-institution node group may pre-agree with the master institution node about the key calculation mode, so that the keys the master institution node and the sub-institution node group calculated are corresponding to each other, i.e., the master institution node provides the sub-institution node group with the first key keycode, and the sub-institution node group provides the master institution node group with the second key keycode. Therefore, the master institution node generates the second key according to the second key keycode, and the sub-institution node group generates the first key according to the first key keycode, so that after the data uploaded by the sub-institution through the sub-institution node group and encrypted by the first key is downloaded by the master institution node, the master institution node may decrypt the downloaded encrypted data by the second key to obtain the data plaintext, and sends the data plaintext to the blockchain data storage area after encrypting the data plaintext.

In this embodiment, the sub-institution node group and the master node calculate to obtain the corresponding keys, that is, the sub-institution node group calculates to obtain the first key, and the master node calculates to obtain the key corresponding to the first key, so that after the data uploaded by the sub-institution node group through the sub-institution and encrypted with the first key is downloaded by the master node, the master institution node may decrypt the downloaded encrypted data to obtain data plaintext, and send the data plaintext to the blockchain data storage area after encrypting the data plaintext, so that the data is better secured in the transmission process.

Figure 3:
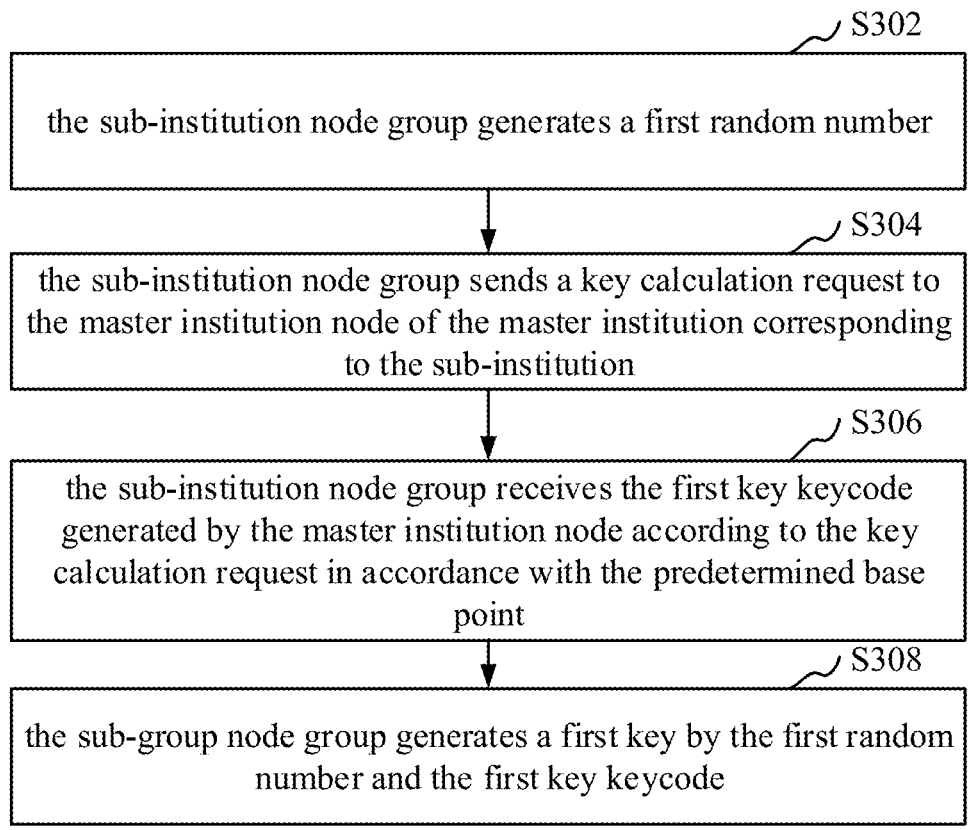
FIG. 3 is a flow chart of a data encryption step in accordance with one or more embodiments.

Referring to FIG. 3, FIG. 3 is a flowchart of a data first key generating step according to one or more embodiments. The first key generating step may be performed prior to step S208 in the embodiment shown in FIG. 2, i.e., prior to data uploaded by the sub-institution is uploaded to the blockchain temporary storage area, the first key generating step is performed, after a first key is obtained by the first key generating step, and the data is encrypted by the first key. The first key generating step may include:

In step S302: the sub-institution node group generates a first random number.

In step S304: the sub-institution node group sends a key calculation request to the master institution node of the master institution corresponding to the sub-institution.

In one embodiment, when the sub-institution node group selected a node in an idle state to receive data uploaded by the sub-institution, the selected idle node or the distribution node may generate a first random number m, and then a first key calculation request is generated according to the first random number m and sent to the master institution node. So as to facilitate calculation of the key by the master node according to a key exchange protocol. The key exchange protocol may be a shared profile parameter, the shared profile parameters may include an elliptic curve, an order, and a base point. The shared profile of each sub-institution is different from that of the master institution. For example, the master institution A is arranged thereunder a sub-institution A1, a sub-institution A2, and a sub-institution A3, and the master institution is arranged thereunder a sub-institution B1, a sub-institution B2, and a sub-institution B3. Then a first shared profile parameter can be arranged between the master institution A and the sub-institution A1. A second shared profile parameter may be arranged between the master institution A and the sub-institution A2. A third shared profile parameter may be arranged between the master institution A and the sub-institution A3. A fourth shared profile parameter may be arranged between the master institution B and the sub-institution B1. A fifth shared profile parameter may be arranged between the master institution B and the sub-institution B2. A sixth shared profile parameter may be set between the master institution B and the sub-institution B3. So that all the shared profile parameters are different between the sub-institutions and the master institution, and the shared profile parameter may be pre-stored in a secured hardware in the sub-institution node group and the master institution node to prevent theft by lawbreakers.

The selected idle node or distribution node may generate the second key keycode M=m×G according to the first random number m and the base point obtain the identifier of the sub-institution according to the data upload request sent by the sub-institution, and obtain the master institution corresponding to the sub-institution according to the identifier of the sub-institution. For example, the master institution corresponding to the sub-institution may be obtained by querying the correspondence table between the sub-institution and the master institution stored in the node group, and the second key keycode M may be sent to the master institution node of the master institution corresponding to the sub-institution.

In step S306: the sub-institution node group receives the first key keycode generated by the master institution node according to the key calculation request in accordance with the predetermined base point.

In one embodiment, after the key calculation request is obtained, the master institution node firstly obtains a preset shared profile parameter, i.e., the base point according to the identifier of the sub-institution, then generates a second random number n, and generates a first key keycode N=n×G according to the second random number and the base point G The generated first key keycode is fed back to the sub-institution node group, so as to facilitate the sub-institution node group to generate a corresponding key according to the first key keycode, and the master node can also generate a corresponding second key according to the second key keycode M sent by the node group, e.g., Q'=n× M.

In step S308: the sub-group node group generates a first key by the first random number and the first key keycode.

In one embodiment, after the sub-institution node group receives the first key keycode N generated by the master institution node, the first key is generated according to the first key keycode and the first random number, in one embodiment, Q=m×N. As such, since the second key Q'=n× M=n×m×G=m×n×G=m×N=Q, the first key and the second key can be calculated with a same key without the master institution node and the sub-institution node group sharing any secret. And the transfer of M can be public, even if the M is obtained by an attacker, since the discrete problem of the elliptic curve is a logarithmic problem, which is a challenging problem and generally not vulnerable to be cracked, the attacker is unable to calculate to obtain m with M and G such that the keys can be calculated with the same key without the master institution node and the sub-institution node group sharing any secret. This increases the confidentiality, and does not burden the master institution node with a large calculation load, and will not leak any data existing in the master institution node.

In one embodiment, after the first key is calculated, the data uploaded by the sub-institution is encrypted by the first key and then uploaded to the blockchain temporary storage area, so that the master institution node may download the encrypted data from the blockchain temporary storage area. And then the data is decrypted with the calculated second key and uploaded to the blockchain data storage area.

In the foregoing embodiment, a common key can be calculated without the sub-institution node group and the master institution node sharing any secret. And the data is uploaded to the blockchain temporary storage area through the key, the security of the data in the process of uploading can be ensured. In addition, only the master node having knowledge of the key can download and use the data, thereby preventing the data from being obtained and used by other lawbreakers.

Figure 4:
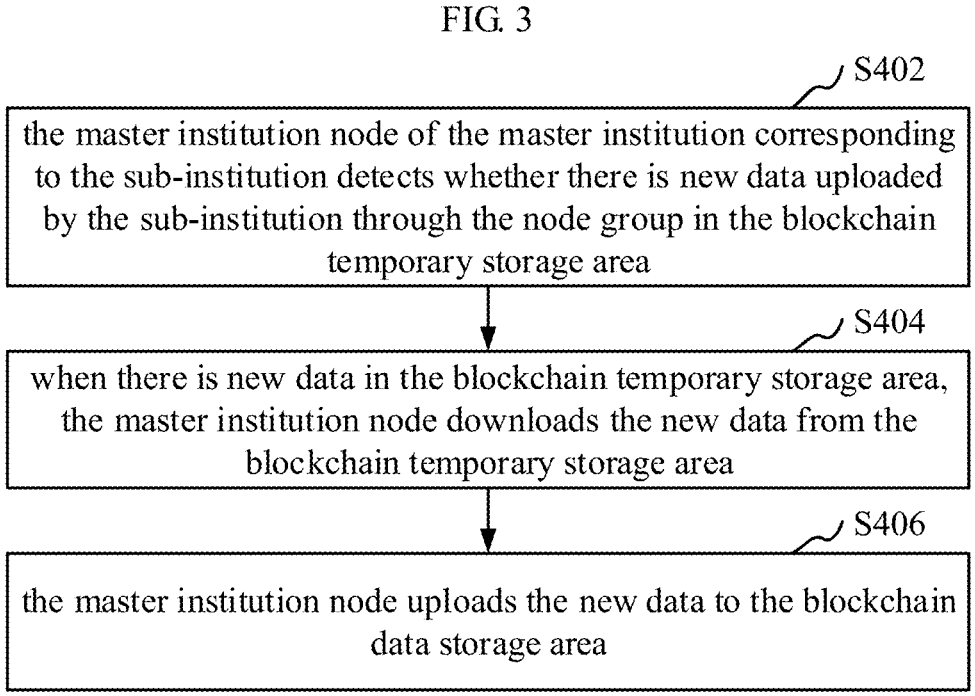
FIG. 4 is a flow chart of step S208 in the embodiment shown in FIG. 2.

Referring to FIG. 4, in one embodiment, FIG. 4 is a flowchart of step S208 of the embodiment shown in FIG. 2. In step S208, i.e., after the master institution node of the master institution corresponding to the sub-institution downloads the data uploaded by the sub-institution from the temporary storage area, the downloaded data is uploaded to the blockchain data storage area may include:

In step S402: the master institution node of the master institution corresponding to the sub-institution detects whether there is new data uploaded by the sub-institution through the node group in the blockchain temporary storage area.

In one embodiment, the sub-institution may upload data to the blockchain temporary storage area through the sub-institution node group, and then the master institution node may periodically detect whether there is new data in the blockchain temporary storage area, and if there is new data, the new data is added to the blockchain data storage area. So that other users can obtain the data according to the user authorities thereby realizing the blockchain data sharing effect.

In step S404: when there is new data in the blockchain temporary storage area, the master institution node downloads the new data from the blockchain temporary storage area.

In one embodiment, when there is new data in the blockchain temporary storage area, i.e., it indicates that the sub-institution uploaded some data, the master institution node downloads the new data from the blockchain temporary storage area to the master institution node, and then uploads the data to the blockchain data storage area. As the data was uploaded to the blockchain, the speed thus will be faster in the second uploading. By way of setting a flag bit, whether there is new data in the blockchain temporary storage area can be indicated. For example, the flag bit is reset whenever the data in the blockchain temporary storage area changes, so that the master node may determine whether there is new data in the blockchain temporary storage area according to the flag bit of the blockchain temporary storage area, if there is new data, the new data is downloaded to the master node.

In step S406: the master institution node uploads the new data to the blockchain data storage area.

In one embodiment, after the new data is downloaded, the master institution node may encrypt the data according to an encryption/decryption mode agreed with the blockchain data storage area. For example, the new data is encrypted first and then sent to the blockchain data storage area, such that the decryption can be performed according to the decryption mode agreed with the blockchain when other users need to use the data, so as to facilitate the processing of the data.

In addition, when uploading data, the master institution may send the data of the master institution to the master institution node after the data is encrypted based on the agreed encryption relation between the master institution and the node, and then the master institution node decrypts and obtains the plaintext, and then the encrypted data is uploaded to the blockchain data storage area, so as to realize the uploading of the master institution data.

In the foregoing embodiment, the node in the deployed node group receive the data uploaded by the sub-institution, and store the data uploaded by the sub-institution in the blockchain temporary storage area, so that the master institution node of the master institution corresponding to the sub-institution can upload the data stored in the temporary storage area to the blockchain data storage area. The data uploading is completed without manually aggregating all the data to the master institution, the pressure of the master institution is reduced. And the master institution node downloads the data from the temporary storage area and uploads the data to the blockchain data storage area only when new data is detected to be added in the blockchain temporary storage area. And it is not necessary to download all the data in the blockchain temporary storage area to the master node every time, thereby reducing the transmission volume of the data.

In one embodiment, prior to the step that the new data is uploaded to the blockchain data storage area, further includes the master institution node decrypts the new data by a second key, the second key is generated according to a second key keycode provided by the sub-institution node group. For example, the sub-institution node group may pre-agree with the master institution node about the key calculation mode, so that the keys calculated by the master institution node and the sub-institution node group are corresponding, i.e., the master institution node provides the sub-institution node group with the first key keycode, and the sub-institution node group provides the master institution node group with the second key keycode. So that the master institution node generates a second key according to the second key keycode, and the sub-institution node group generates a first key according to the first key keycode, so that the first key corresponds to the second key. So that after the data uploaded by the sub-institution node group through the sub-institution and encrypted by the first key is downloaded by the master institution node, the master institution node may decrypt the downloaded encrypted data according to the second key to obtain the data plaintext, and send the data plaintext to the blockchain data storage area after the data plaintext is encrypted.

In this embodiment, the first key is calculated and obtained by the sub-institution node group, the second key is calculated and obtained by the master node, and the first key corresponds to the second key. So that after the data uploaded by the sub-institution node group through the sub-institution and encrypted by the first key is downloaded by the master node, the master institution node may decrypt the downloaded encrypted data with the second key to obtain the data plaintext, and send the data plaintext to the blockchain data storage area after the data plaintext is encrypted, so that the data is better secured in the transmission process. In one embodiment, the method may further include a second key generating step. The second key generating step may include: the master institution node receives a key calculation request sent by the node group, a second key keycode generated by the sub-institution node group according to a predetermined base point is carried by the key calculation request; the master institution node generates a second random number; and the master institution node generates a second key according to the second key keycode and the second random number. Therefore, prior to the step of the new data is uploaded to the blockchain data storage area, the method may further include that the new data is decrypted by the second key.

In one embodiment, shared profile parameters are stored in the sub-institution node group and each master institution node. For example, a first shared profile parameter is stored in the first master institution node, a second shared profile parameter is stored in the second master institution node, and all shared profile parameters are stored in the sub-institution node group. Each shared profile parameter includes an elliptic curve E, an order N, and a base point G The sub-institution node group obtains the base point G corresponding to the master institution node first, then generates the second key keycode according to the base point i.e., $M=m\times G$, and sends the second key code to the master institution node, and the master institution node generates the first key keycode $N=n\times G$ according to its stored base point G and sends the first key keycode to a sub-institution node group, m and n are random numbers. The sub-institution node group calculates the key $Q=m\times N$ after the first key keycode is received, and the master institution node calculates the key $Q'=n\times M$ after receiving the second key keycode, according to the exchange law and the combination law $Q=Q'$. The transfer of M may be public, i.e. an attacker may obtain M. but since the problem of discrete logarithm of elliptic curve is a challenging problem, the attacker may not be able to calculate m with M and G Thereby a key can be negotiated without sharing any secret between the exchanging parties.

In the foregoing embodiment, a common key can be calculated without the sub-institution node group and the master institution node sharing any secret. And the data is uploaded to the blockchain temporary storage area through the key, the security of the data in the process of uploading can be ensured. In addition, only the master node having knowledge of the key can download and use the data, thereby preventing the data from being obtained and used by other lawbreakers.

It should be understood that although the respective steps in the flowcharts of FIGS. 2 to 4 are sequentially shown as indicated by the arrows, these steps are not necessarily sequentially performed in the order indicated by the arrows. The performance of these steps is not critical to the order in which they are performed unless explicitly stated herein, and the steps may be performed in other orders. Moreover, at least some of the steps in FIGS. 2 to 4 may include a plurality of sub-steps or phases, which are not necessarily performed at the same time, but may be performed at different times, and the order in which the sub-steps or stages are performed is not necessarily performed in sequence, but may be performed in turn or alternatively with other steps or at least a portion of sub-steps or phases of other steps.

Referring to FIG. 1, in an embodiment, a system of uploading blockchain data includes a sub-institution node group and a master institution node, the master institution node group is configured to receive a data upload request sent by a sub-institution; look up a node in an idle state in the sub-institution node group according to the data upload request; and receive data uploaded by the sub-institution through the node in the idle state, and upload data received to a blockchain temporary storage area.

The master institution node of the master institution corresponds to the sub-institution and is configured to download the data uploaded by the sub-institution from the temporary storage and then upload the downloaded data to a blockchain data storage area.

In one embodiment, the step of the sub-institution node group to look up the node in the idle state in the sub-institution node group according to the data upload request includes: to look up a node in a normal working state in the sub-institution node group according to the data upload request; traverse the looked up nodes in the normal working state according to a preset order; if the currently traversed node in the normal working state is uploading data, continue to traverse a next node in the normal working state according to the preset order until the traversed node in the normal working state is in the idle state, and then obtain the node in the idle state.

In one embodiment, the sub-institution node group is further configured to encrypt the data uploaded by the sub-institution with a first key prior to the step that the received data is uploaded to the blockchain temporary storage area, the first key is generated according to the key code provided by the master institution node.

In one embodiment, the sub-institution node group is further configured to generate a first random number; send a key calculation request to the master institution node of the master institution corresponding to the sub-institution; receive the first key keycode generated by the master institution node according to the key calculation request in accordance with a predetermined base point; and generate the first key by the first random number and the first key keycode.

In one embodiment, the master institution node of the master institution corresponding to the sub-institution detects whether there is new data uploaded by the sub-institution node group in the blockchain temporary storage area; and when there is new data in the blockchain temporary storage area, the master institution node downloads the new data from the blockchain temporary storage area; and the master institution node uploads the new data to the blockchain data storage area.

In one embodiment, the master institution node is further configured to, prior to that the master institution node uploads the new data to the blockchain data storage area, decrypt the new data by a second key, the second key is generated according to a second key keycode provided by the sub-institution node group.

In one embodiment, the master institution node is further configured to receive a key calculation request sent by the node group, a second key keycode generated by the sub-institution node group according to a predetermined base point is carried by the key calculation request; the master institution node generates a second random number; and the master institution node generates a second key according to the second key keycode and the second random number.

For the specific limitations of the system of uploading blockchain data, reference may be made to the specific limitations of the method of uploading blockchain data in the foregoing and are described for brevity. Each of the modules in the described system of uploading blockchain data may be implemented in whole or in part by software, hardware, or a combination thereof. Each of the above modules may be embedded in or independent from the processor in the computer device in the form of hardware, or may be stored in the memory in the computer device in the form of software, so as to facilitate the processor to call and execute the operations corresponding to each of the above modules.

Figure 5:
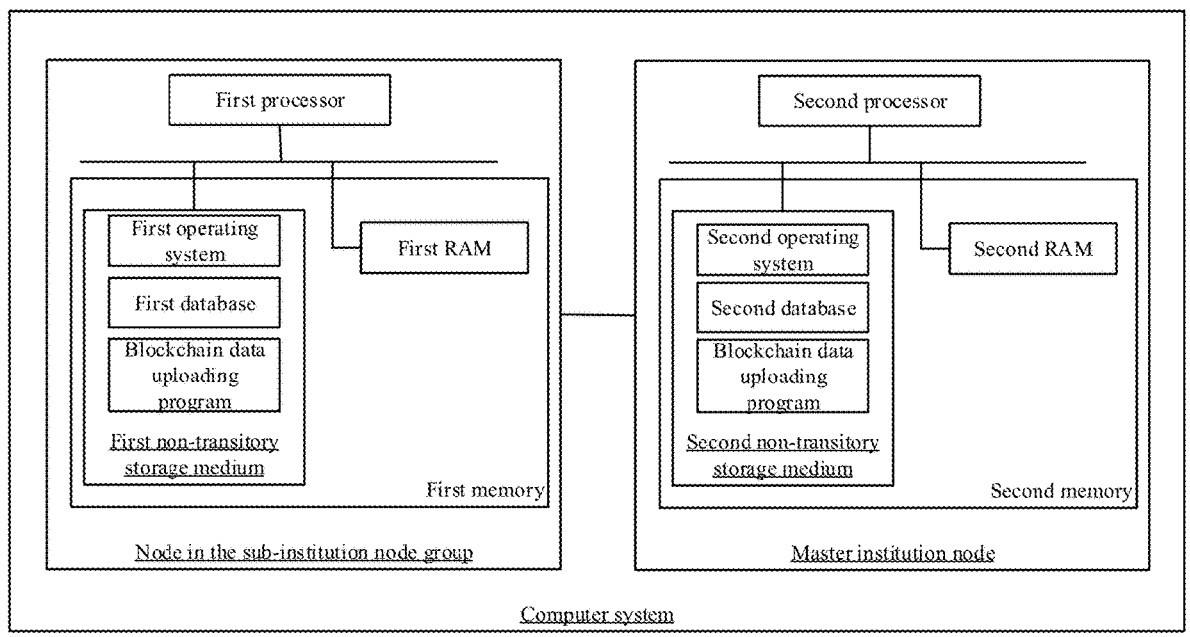
FIG. 5 is a schematic diagram of a computer system in accordance with one or more embodiments.

An embodiment of the present disclosure provides a computer system. The computer system includes a series of computer-readable instructions stored on a memory. When the computer-readable instructions are executed by a processor, the method of uploading blockchain data provided in each of the embodiments of the present disclosure can be implemented. In some embodiments, Specific operations of different parts are implemented according to the computer-readable instructions. Referring to FIG. 5, a computer system is provided. The computer system includes a sub-institution node group and a master institution node of a master institution corresponding to the sub-institution. The internal structure of the computer system may correspond to the structure shown in FIG. 5. The sub-institution node group includes a plurality of nodes which can be a server. The plurality of nodes respectively include a first memory, a first processor, a first operating system, a first network interface, and a first database connected through a system bus. The first processor of the node is configured to provide calculation and control capabilities. The first memory includes a non-transitory computer-readable instruction storage medium, a random access memory (RAM). The non-transitory computer-readable instruction storage medium has an operating system, computer-readable instructions, and a database stored thereon. The RAM provides an environment for execution of the operating system and the computer-readable instructions in the non-transitory computer-readable instruction storage medium. The first network interface is configured to communicate with an external terminal via network connection. The master institution node may be a server, the master institution node includes a second memory, a second processor, a second operating system, a second network interface, and a second database connected through a system bus. The second processor of the master institution node is configured to provide computing and control capabilities. The second memory includes a non-transitory computer-readable instruction storage medium and a RAM. The non-transitory computer-readable instruction storage medium has an operating system, computer-readable instructions and database stored thereon. The RAM provides an environment for execution of the operating system and the computer-readable instructions in the non-transitory computer-readable instruction storage medium. The second network interface is configured to communicate with an external terminal through a network connection. The computer-readable instructions are executed by the first processor or the second processor to implement a method of uploading blockchain data.

In one embodiment, the structure shown in FIG. 5 is only a block diagram of a partial structure related to the solution of the present application, and does not constitute a limitation on the computer system to which the solution of the present application is applied. The particular computer system may include more or less components than what is illustrated or be in combination with some components or have a different arrangement of components.

A computer system includes a memory and one or more processors, the memory has computer-readable instructions stored thereon which, when executed by one or more first processors, causes the one or more first processors to perform the following steps: a data upload request sent by a sub-institution is received; a node in an idle state in the sub-institution node group is looked up according to the data upload request; data uploaded by the sub-institution is received through the node in the idle state and then the received data is uploaded to a blockchain temporary storage area; when executed by one or more second processors, the computer-readable instructions cause the one or more second processors to perform the following step: the data uploaded by the sub-institution is downloaded from the temporary storage area, and then the downloaded data is uploaded to a blockchain data storage area.

In one embodiment, the step that the node in the idle state in the sub-institution node group is looked up according to the data upload request provided by the first processor executing the computer-readable instructions includes: a node in a normal working state in the sub-institution node group is looked up according to the data upload request; the looked up nodes in the normal working state is traversed according to a preset order; and if the currently traversed node in the normal working state is uploading data, a next node in the normal working state is continue to be traversed according to the preset order, until the traversed node in the normal working state is in the idle state, and obtaining the node in the idle state.

In one embodiment, prior to the step that the received data is uploaded to the blockchain temporary storage area provided by the first processor executing the computer-readable instructions, further includes: the data uploaded by the sub-institution is encrypted by a first key, the first key is generated according to a first key keycode provided by the master institution node.

In one embodiment, the first processor further executes the computer-readable instructions to perform the following steps: a first random number is generated; a key calculation request is sent to the master institution node of the master institution corresponding to the sub-institution; the first key keycode generated by the master institution node is received according to the key calculation request in accordance with a predetermined base point; and the first key is generated by the first random number and the first key keycode.

In one embodiment, the step that the data uploaded by the sub-institution is downloaded from the temporary storage area, and then the downloaded data is uploaded to the blockchain data storage area provided by the second processor executing the computer-readable instructions includes: whether there is new data uploaded by the sub-institution node group is detected in the blockchain temporary storage area; and when there is new data in the blockchain temporary storage area, the new data is downloaded from the blockchain temporary storage area; and the new data is uploaded to the blockchain data storage area.

In one embodiment, prior to the step that the new data is uploaded to the blockchain data storage area provided by the second processor executing the computer-readable instructions, further includes: the new data is encrypted by a second key, the second key is generated according to a second key keycode provided by the sub-institution node group.

In one embodiment, the second processor further executes the computer-readable instructions to perform the following steps: a key calculation request sent by the node group is received, a second key keycode generated by the sub-institution node group according to a predetermined base point is carried by the key calculation request; a second random number is generated; and a second key according to the second key keycode and the second random number is generated.

One or more non-transitory computer-readable storage medium has computer-readable instructions stored therein which, when executed by one or more first processors, cause the one or more first processors to perform the following steps: a data upload request sent by a sub-institution is received; a node in an idle state in the sub-institution node group is looked up according to the data upload request; data uploaded by the sub-institution is received through the node in the idle state and then the received data is uploaded to a blockchain temporary storage area; when executed by one or more second processors, the computer-readable instructions cause the one or more second processors to perform the following step: the data uploaded by the sub-institution is downloaded from the temporary storage area, and then the downloaded data is uploaded to a blockchain data storage area.

In one embodiment, the step that the node in the idle state in the sub-institution node group is looked up according to the data upload request provided by the one or more first processors executing the computer-readable instructions includes: a node in a normal working state in the sub-institution node group is looked up according to the data upload request; the looked up nodes in the normal working state is traversed according to a preset order; and if the currently traversed node in the normal working state is uploading data, a next node in the normal working state is continue to be traversed according to the preset order, until the traversed node in the normal working state is in the idle state, and obtaining the node in the idle state.

In one embodiment, prior to the step that the received data is uploaded to the blockchain temporary storage area provided by the one or more first processors executing the computer-readable instructions, further includes: the data uploaded by the sub-institution is encrypted by a first key, the first key is generated according to a first key keycode provided by the master institution node.

In one embodiment, the one or more first processors further executes the computer-readable instructions to perform the following steps: a first random number is generated; a key calculation request is sent to the master institution node of the master institution corresponding to the sub-institution; the first key keycode generated by the master institution node is received according to the key calculation request in accordance with a predetermined base point; and the first key is generated by the first random number and the first key keycode.

In one embodiment, the step that the data uploaded by the sub-institution is downloaded from the temporary storage area, and then the downloaded data is uploaded to the blockchain data storage area provided by the one or more second processors executing the computer-readable instructions includes: whether there is new data uploaded by the sub-institution node group in the blockchain temporary storage area is detected; and when there is new data in the blockchain temporary storage area, the new data is downloaded from the blockchain temporary storage area; and the new data is uploaded to the blockchain data storage area.

In one embodiment, prior to the step that the new data is uploaded to the blockchain data storage area provided by the one or more second processors executing the computer-readable instructions, further includes: the new data is decrypted by a second key, the second key is generated according to a second key keycode provided by the sub-institution node group.

In one embodiment, the second processor further executes the computer-readable instructions to perform the following steps: a key calculation request sent by the node group is received, a second key keycode generated by the sub-institution node group according to a predetermined base point is carried by the key calculation request; a second random number is generated; and a second key is generated according to the second key keycode and the second random number.

Some embodiments may be implemented by computer-readable instructions instructing relevant hardware. The computer-readable instructions may be stored in a non-transitory computer-readable storage medium. When the computer-readable instructions are executed, flows of embodiments of the methods as described above may be included. Any references to memory, storage, databases, or other media used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchronous Link DRAM (SLDRAM), Memory Bus (Rambus) Direct RAM (RDRAM), Direct Memory Bus Dynamic RAM (DRDRAM), Memory Bus Dynamic RAM (RDRAM) etc.

What is claimed is:

1. A method of uploading blockchain data, comprising:
  a sub-institution node group receiving a data upload request sent by a sub-institution;
  the sub-institution node group looking up a node in an idle state in the sub-institution node group according to the data upload request;
  the sub-institution node group receiving data uploaded by the sub-institution through the node in the idle state and uploading the received data to a blockchain temporary storage area; and
  the master institution node of the master institution corresponding to the sub-institution downloading the data uploaded by the sub-institution from the temporary storage area, and then uploading the downloaded data to a blockchain data storage area.

2. The method according to claim 1, wherein prior to the uploading the received data to the blockchain temporary storage area, further comprising:
  the sub-institution node group encrypting the data uploaded by the sub-institution by a first key, wherein the first key is generated according to a first key keycode provided by the master institution node.

3. The method according to claim 2, wherein the method further comprising:
  the sub-institution node group generating a first random number;
  the sub-institution node group sending a key calculation request to the master institution node of the master institution corresponding to the sub-institution;
  the sub-institution node group receiving the first key keycode generated by the master institution node according to the key calculation request in accordance with a predetermined base point; and
  the sub-institution node group generating the first key by the first random number and the first key keycode.

4. The method according to claim 1, wherein the master institution node of the master institution corresponding to the sub-institution downloading the data uploaded by the sub-institution from the temporary storage area, and then uploading the downloaded data to the blockchain data storage area comprises:
  the master institution node of the master institution corresponding to the sub-institution detecting whether there is new data uploaded by the sub-institution node group in the blockchain temporary storage area;
  when there is new data in the blockchain temporary storage area, the master institution node downloading the new data from the blockchain temporary storage area; and
  the master institution node uploading the new data to the blockchain data storage area.

5. The method according to claim 4, wherein prior to the master institution node uploading the new data to the blockchain data storage area, further comprising:
  the master institution node decrypting the new data by a second key, wherein the second key is generated according to a second key keycode provided by the sub-institution node group.

6. The method according to claim 5, wherein the method further comprising:
  the master institution node receiving a key calculation request sent by the node group, wherein the second key keycode generated by the sub-institution node group according to a predetermined base point is carried by the key calculation request;
  the master institution node generating a second random number; and
  the master institution node generating a second key according to the second key keycode and the second random number.

7. A computer system comprising a sub-institution node group and a master institution node of a master institution corresponding to the sub-institution;
  the sub-institution node group comprises a plurality of nodes, the plurality of nodes comprises a first memory and one or more first processors, the first memory has computer-readable instructions stored therein which, when executed by the one or more first processors, cause the one or more first processors to perform:
  receiving a data upload request sent by a sub-institution;
  looking up a node in an idle state in the sub-institution node group according to the data upload request; and
  receiving data uploaded by the sub-institution through the node in the idle state and then uploading the received data to a blockchain temporary storage area;
  the master institution node of the master institution corresponding to the sub-institution comprises a second memory and one or more second processors, the second memory has computer-readable instructions stored therein which, when executed by the one or more second processors, cause the one or more second processors to perform:
  downloading the data uploaded by the sub-institution from the temporary storage area, and then uploading the downloaded data to a blockchain data storage area.

8. The computer system according to claim 7, wherein prior to uploading the received data to the blockchain temporary storage area provided by the first processor executing the computer-readable instructions, further comprising:
  encrypting the data uploaded by the sub-institution by a first key, wherein the first key is generated according to a first key keycode provided by the master institution node.

9. The computer system as claimed in claim 8, wherein the first processor further executes the computer-readable instructions to provide:
  generating a first random number;
  sending a key calculation request to the master institution node of the master institution corresponding to the sub-institution;
  receiving the first key keycode generated by the master institution node according to the key calculation request in accordance with a predetermined base point; and
  generating the first key by the first random number and the first key keycode.

10. The computer system according to claim 7, wherein the downloading the data uploaded by the sub-institution from the temporary storage area, and then uploading the downloaded data to the blockchain data storage area provided by the second processor executing the computer-readable instructions comprises:
  detecting whether there is new data uploaded by the sub-institution node group in the blockchain temporary storage area; and
  when there is new data in the blockchain temporary storage area, downloading the new data from the blockchain temporary storage area; and
  uploading the new data to the blockchain data storage area.

11. The computer system according to claim 10, wherein prior to uploading the new data to the blockchain data storage area provided by the second processor executing the computer-readable instructions, further comprises:
  decrypting the new data by a second key, wherein the second key is generated according to a second key keycode provided by the sub-institution node group.

12. The computer system according to claim 11, wherein the second processor further executes the computer-readable instructions to provide:
  receiving a key calculation request sent by the node group, wherein the second key keycode generated by the sub-institution node group according to a predetermined base point is carried by the key calculation request;
  generating a second random number; and
  generating a second key according to the second key keycode and the second random number.

13. One or more non-transitory computer-readable storage medium having computer-readable instructions stored therein which, when executed by one or more first processors, causing the one or more first processors to perform:
  receiving a data upload request sent by a sub-institution;
  looking up a node in an idle state in the sub-institution node group according to the data upload request; and
  receiving data uploaded by the sub-institution through the node in the idle state and then uploading the received data to a blockchain temporary storage area;
  when executed by one or more second processors, the computer-readable instructions cause the one or more second processors to provide:
  downloading the data uploaded by the sub-institution from the temporary storage area, and then uploading the downloaded data to a blockchain data storage area.

14. The storage medium of claim 13, wherein prior to uploading the received data to the blockchain temporary storage area provided by the first processor executing the computer-readable instructions, further comprising:
  encrypting the data uploaded by the sub-institution by a first key, wherein the first key is generated according to a first key keycode provided by the master institution node.

15. The storage medium of claim 14, wherein the first processor further executes the computer-readable instructions to provide:
  generating a first random number;
  sending a key calculation request to the master institution node of the master institution corresponding to the sub-institution;
  receiving the first key keycode generated by the master institution node according to the key calculation request in accordance with a predetermined base point; and
  generating the first key by the first random number and the first key keycode.

* * * * *